United States Patent [19]

Michalowicz

[11] 4,292,248
[45] Sep. 29, 1981

[54] PREPARATION OF HYDROXYANTHRAQUINONES

[75] Inventor: William A. Michalowicz, Lock Haven, Pa.

[73] Assignee: American Color & Chemical Corporation, Charlotte, N.C.

[21] Appl. No.: 45,864

[22] Filed: Jun. 6, 1979

Related U.S. Application Data

[63] Continuation-in-part of Ser. No. 860,224, Dec. 13, 1977, abandoned.

[51] Int. Cl.³ .............................................. C07C 50/18
[52] U.S. Cl. .................................................... 260/383
[58] Field of Search ......................................... 260/383

[56] References Cited

U.S. PATENT DOCUMENTS 3,031,466 4/1962 Budziarek et al. ................... 260/383
3,906,013 9/1975 Reubk et al. ......................... 260/383

OTHER PUBLICATIONS

*The Merck Index,* Stecher et al., Merck and Co., Inc., N.J., 1960, p. 952.

*Primary Examiner*—Winston A. Douglas
*Assistant Examiner*—Raymond K. Covington
*Attorney, Agent, or Firm*—Armstrong, Nikaido, Marmelstein & Kubovcik

[57] ABSTRACT

A process for preparing hydroxyanthraquinones from the corresponding nitroanthraquinones is provided. A nitroanthraquinone is reacted with a metal salt selected from sodium formate, potassium formate, sodium carbonate and potassium carbonate, in a specific reaction medium at a reaction temperature and for a time sufficient to convert the nitroanthraquinone to the corresponding hydroxyanthraquinone.

8 Claims, No Drawings

PREPARATION OF HYDROXYANTHRAQUINONES

This application is a continuation-in-part of application Ser. No. 860,224, filed Dec. 13, 1977, now abandoned.

BACKGROUND OF THE INVENTION

1. Field of the Invention

This invention relates to the preparation of hydroxyanthraquinones and, more particularly, to the preparation of 1-hydroxyanthraquinone and dihydroxyanthraquinones from the corresponding nitroanthraquinones.

2. Description of the Prior Art

Hydroxyanthraquinones, and, particularly, hydroxyanthraquinones substituted in 1 or 2 peri positions with hydroxy groups such as 1-hydroxyanthraquinone; 1,5-dihydroxyanthraquinone; and 1,8-dihydroxyanthraquinone are valuable intermediates for dye manufacture. These compounds also have utility as starting materials for other useful and desirable dye intermediates and in the pharmaceutical area.

Various methods for preparing these hydroxyanthraquinones are described in the prior art. The disclosed preparative routes to 1-hydroxyanthraquinone include high temperature (190° to 200° C.) hydrolysis of 1-nitroanthraquinone in water containing calcium hydroxide or pyridine; high temperature aqueous hydrolysis of 1-anthraquinonesulfonic acid with alkali and decomposition of diazotized 1-aminoanthraquinone. More recent methods include the aqueous hydrolysis of 1-anthraquinonesulfonic acid at 200°-300° C. (USSR Pat. No. 68330) and the oxidation of either anthracene or anthraquinone in an aqueous system with air and bromide at about 260° C. at 75 atmospheres pressure (German Pat. No. 1,160,124).

The preparative routes to 1,5-dihydroxyanthraquinone and 1,8-dihydroxyanthraquinone are analogous to those for 1-hydroxyanthraquinone. Published references disclose the alkaline hydrolysis of 1,5-dinitroanthraquinone and 1,8-dinitroanthraquinone at 200° C., the caustic fusion of 1,5-anthraquinonedisulfonic acid and 1,8-anthraquinonedisulfonic acid and the diazotization of 1,5-diaminoanthraquinone and 1,8-diaminoanthraquinone followed by decomposition of the bisdiazo compound.

More recently, USSR Pat. No. 230,187 describes the caustic fusion of the sodium salts of 1,5-anthraquinonedisulfonic acid and 1,8-anthraquinonedisulfonic acid at a temperature of 140°-160° C. and a pressure of about 3 to 4 atmospheres. German Pat. No. 2,108,575 discloses the condensation of m-hydroxybenzoic acid in a sodium chloride-aluminum chloride melt at 170° to 210° C. to give good yields of 1,5-dihydroxyanthraquinone. U.S. Pat. No. 3,884,943 discloses the acid hydrolysis of 1,5-dimethoxyanthraquinone and 1,8-dimethoxyanthraquinone in glacial acetic acid-sulfuric acid to the corresponding dihydroxyanthraquinones, the dihydroxyanthraquinones being separated by fractional crystallization from the hydrolysis medium. U.S. Pat. No. 4,002,654 describes the alkaline hydrolysis of 1,5-anthraquinonedisulfonic acid and 1,8-anthraquinonedisulfonic acid at 300°-340° C. using calcium oxide.

The previously known methods for preparing hydroxyanthraquinones, however, have various drawbacks. For example, the methods most often used in the past are those based on anthraquinonesulfonic acids in which the sulfo groups are in one or more peri positions which can only be made by the sulfonation of anthraquinone in the presence of mercury or its salts. These methods are ecologically unacceptable in view of the subsequent discharge of mercury compounds to the environment. Attempts to isolate these compounds and/or remove them from effluent streams have been either ineffective or are economically unattractive.

The methods for preparing hydroxyanthraquinones starting with peri nitrated anthraquinones require large amounts of energy to achieve the necessary high temperatures and require specially designed pressure or fusion vessels to withstand the rigorous conditions employed.

Moreover, the known methods for preparing the hydroxyanthraquinones generally require multi-step procedures.

It is an object of the present invention, therefore, to provide a process for the preparation of hydroxyanthraquinones and, particularly, anthraquinone substituted with hydroxy groups in one or two peri positions and which is devoid of the disadvantages of the prior art methods.

This and other objects will be apparent to those skilled in the art from the following description and discussion.

SUMMARY OF THE INVENTION

According to the present invention there is provided a process for preparing 1-hydroxyanthraquinone and dihydroxyanthraquinones by the reaction of the corresponding nitroanthraquinone with, in the preparation of dihydroxyanthraquinones, a metal salt selected from sodium formate and potassium formate and, in the preparation of 1-hydroxyanthraquinone, a metal salt selected from sodium formate, potassium formate, sodium carbonate and potassium carbonate, in a reaction medium selected from dimethylformamide; dimethylacetamide; tetramethylurea; N-methylpyrrolidone; dimethylsulfoxide; tetramethylene sulfone; dimethylsulfone; N,N-dimethylmethylcarbamate and pyridine at a temperature of from about 80° to 150° C. for a time sufficient to convert the nitroanthraquinone to the hydroxyanthraquinone and, thereafter, separating the hydroxyanthraquinone from the reaction system.

The process according to the present invention permits the facile preparation of hydroxyanthraquinone and does not require the use of mercury catalysts or the use of high pressure equipment or high temperatures. The product hydroxyanthraquinones are obtained in sufficient purity to enable their use in dye preparation or dye intermediate preparation.

DESCRIPTION OF PREFERRED EMBODIMENTS

The hydroxyanthraquinones are prepared according to the process of the present invention from the corresponding nitroanthraquinones, i.e., anthraquinones substituted with nitro groups in the positions corresponding to the hydroxy groups of the desired hydroxyanthraquinones. Typically, such nitroanthraquinones include 1-nitroanthraquinone; 1,5-dinitroanthraquinone 1,8-dinitroanthraquinone and mixtures of 1,5-dinitroanthraquinone and 1,8-dinitroanthraquinone. These materials are readily obtained by the nitration of anthraquinone by known techniques using either nitric acid—sulfuric acid mixtures or nitric acid alone. If desired or required, the purity of the nitroanthraquinones can be increased by described methods. Any available nitroanthraquinone, however, is believed to be useful in the process according to the present invention.

The nitroanthraquinone (as used herein the terminology nitroanthraquinone or hydroxyanthraquinone is intended to refer to both individual compounds and mixtures) is reacted with, in the preparation of 1-hydroxyanthraquinone from 1-nitroanthraquinone, sodium or potassium formate or sodium or potassium carbonate or, in the preparation of dihydroxyanthraquinones from the corresponding nitroanthraquinones, sodium or potassium formate. Although other alkali metal and alkaline earth metal salts nd the sodium and potassium salts of other acids such as acetic acid, benzoic acid and inorganic acids such as nitric acid, boric acid, perboric acid, and phosphoric acid will also convert nitroanthraquinones to hydroxyanthraquinones under the conditions of the process according to the present invention, these salts do not provide acceptable yields and purities of the hydroxyanthraquinones according to present standards because, for example, of the formation of substantial amounts of compounds such as hydroxynitroanthraquinones. Of the compounds according to the above-described general formula, sodium formate has been found to give particularly good yields and purity of the hydroxyanthraquinones.

The nitroanthraquinone is treated with the sodium or potassium salt in a suitable reaction medium. Suitable reaction media are dimethylformamide, dimethylacetamide, N-methylpyrrolidone, dimethylsulfoxide, tetramethylene sulfone, pyridine, tetramethylurea and N,N-dimethylmethylcarbamate. Dimethylformamide, dimethylacetamide, tetramethylurea and N-methylpyrrolidone give the best yields and purity of product and, therefore, are preferred. It is preferred that the reaction medium be anhydrous. Although a water content of about less than 5% by weight based on the reaction mass can be tolerated, the reaction rate is reduced and by-product formation is increased.

The reaction is carried out at a temperature of from about 80° C. or higher, for a period of time sufficient to convert the nitroanthraquinone to the corresponding hydroxyanthraquinone. The reaction of the alkali salt with the nitroanthraquinone commences at a measurable rate at about 80° C. The preferred reaction temperature is in the range of from about 95° C. to 145° C. Higher temperatures may be used but are not practical. The temperature of the reaction is also limited according to the reflux temperature of the reaction medium under the reaction conditions employed. The reaction is faster at the higher temperatures but the products isolated are usually darker in color than those obtained at the lower reaction temperatures.

The reaction proceeds with the evolution of gas. Initially, the gas is primarily nitric oxide but towards the completion of the reaction an alkali soluble colorless gas is present which is presumably carbon dioxide. An intermediate compound of unknown structure is formed in the conversion of the nitroanthraquinone to the hydroxyanthraquinone. This intermediate is readily detectable by gas chromatographic analysis (which can be employed to monitor the course of the reaction). During the initial reaction period there is a color change from the original yellowish suspension to a very dark reddish brown apparent solution of the alkali salt of the hydroxyanthraquinone. The reaction is complete in from 1 to 24 hours depending primarily on the temperature of reaction and the particular reaction medium and typically gives yields of the hydroxyanthraquinone from the nitroanthraquinone of 90% or more. Thus, for example, with the reaction of sodium and potassium formate salts with 1,5-dinitroanthraquinone and 1,8-dinitroanthraquinone, gas chromatographic analysis shows that no dinitroanthraquinone remains after 1½ hour at 135° C. and none after 2 hours at 110° C.

The concentration of the nitroanthraquinone in the reaction system can vary but is generally from 6 to 27 weight percent based on the total weight of the reaction system. Higher concentrations of the nitroanthraquinone can be employed but efficient stirring is difficult and much more time is required for completion of the reaction. In the reaction of mixtures of 1,5-dinitroanthraquinone and 1,8-dinitroanthraquinone, high initial concentrations of the dinitroanthraquinone will result in the precipitated 1,5-dihydroxyanthraquinone containing appreciable amounts of 1,8-dihydroxyanthraquinone. This is because the concentration of 1,8-dihydroxyanthraquinone is in excess of its solubility in the reaction media. Where a high purity 1,5-dihydroxyanthraquinone is desired, an initial concentration of 8 to 18% of the dinitroanthraquinone mixture is suitable.

The purity and the composition of the by-products formed in the reaction are dependent on whether an inert, i.e., nitrogen, or oxidizing atmosphere is present during the reaction. In an inert atmosphere, the minor by-product formed is 1-hydroxyanthraquinone where dinitroanthraquinones (1,5 and 1,8-isomers) are reacted. With 1-nitroanthraquinone, the minor by-product is anthraquinone. In an oxidizing atmosphere (for example, created by sparging air or oxygen through the reaction mass), however, the by-product is an hydroxynitroanthraquinone. The 1,5- and 1,8-dihydroxyanthraquinone prepared from the corresponding dinitroanthraquinones in an oxidizing atmosphere are lighter in color and of higher purity by gas chromatographic analysis although they contain small amounts (typically less than 10% by weight) of hydroxynitroanthraquinones.

A molar ratio of the sodium or potassium salts to dinitroanthraquinone or nitroanthraquinone of 1:1 to 5:1 can be successfully employed, the preferred molar ratio being 2:1 to 3:1. At a molar ratio of 1:1, no dinitroanthraquinones are present at the completion of the reaction although appreciable amounts of a hydroxynitroanthraquinone are present. At a molar ratio of 2:1 or more, no hydroxynitroanthraquinones are present when the reaction is conducted under an inert atmosphere but are present in an oxidizing atmosphere. At the molar ratio greater than 3:1 the sodium or potassium salt will be present at the completion of the reaction. No change, however, in the products have been observed when molar ratios in excess of 3:1 have been used.

Upon completion of the reaction, which can be determined by gas chromatographic analysis, the reaction solution is cooled to room temperature and filtered or, alternatively, is drowned in water. The product or products are isolated by filtration following acidification. In the reaction of a 1,5-dinitroanthraquinone and 1,8-dinitroanthraquinone mixture, the reaction solution is cooled to room temperature (25° C. to 27° C.) following completion of the reaction. The 1,5-dihydroxyanthraquinone precipitates as the sodium or potassium salt and is isolated by filtration. The filtrate contains primarily 1,8-dihydroxyanthraquinone in the form of the sodium or potassium salt and may be subjected to either flash distillation to remove the reaction medium or drowned in water to precipitate the product. The products thus isolated are mixed with water and acidified with inorganic acids such as hydrochloric acid, phosphoric acid or sulfuric acid to convert the salt to the free hydroxy group. On a weight conversion basis, the yield of hydroxyanthraquinone is virtually quantitative, the purity varying depending on the purity of the starting nitroanthraquinone.

The purity of the hydroxyanthraquinone obtained according to the process of the present invention will depend on the purity of the nitroanthraquinone employed. High purity product, however, is assured for at least 1-hydroxyanthraquinone and 1,5-dihydroxyanthraquinone by virtue of the reaction procedure which has an inherent fractionation of the components upon cooling of the reaction solution. Thus, the purity of the products obtained by this fractionation can be controlled by adjusting the concentration of the nitroanthraquinone in the reaction medium so that impurities remain in the solution while the desired products precipitate. It is understood, of course, that the purer the starting nitroanthraquinone, the purer the hydroxyanthraquinone obtained.

In the reaction of a mixture of dinitroanthraquinones if the reaction is continued after disappearance of the dinitroanthraquinone and of the intermediate as indicated by GLC analysis, there is a gradual increase in the 1-hydroxyanthraquinone content at the expense of the dihydroxyanthraquinones. In cases in which a crude dinitroanthraquinone containing appreciable amounts of 1,6-, 1,7-, 2,6-, and 2,7-dinitroanthraquinone is treated, the corresponding dihydroxyanthraquinones are obtained but are difficult to identify quantitatively.

The invention may be further understood by referring to the following examples.

EXAMPLE 1

1-Nitroanthraquinone (96.4%, 3.4%-dinitroanthraquinones), (7.6 g; 0.03 mole), dimethylformamide (50 ml), and sodium formate (4.1 g; 0.06 mole) were stirred at 130° C. for 17 hours. There was a slow evolution of gas during the reaction period. The reaction mass was cooled, mixed with water (300 ml) and acidified with 32% hydrochloric acid. The resulting suspension was stirred for one hour and filtered. The cake obtained was washed with water, then dried to give 1-hydroxyanthraquinone (6.6 g; 0.03 mole) which by gas chromatographic analysis contained 96.4% 1-hydroxyanthraquinone; 1.8% 1-nitroanthraquinone and 1.8% anthraquinone.

EXAMPLE 2

Dinitroanthraquinone (54.1% 1,5-; 42.1% 1,8-; 3.8% other isomers, 18.0 g, 0.06 mole), dimethylformamide, 100 ml, and sodium formate, 12.2 g, 0.18 mole, were stirred at 110° C. while air was sparged (approximately 60–80 ml per minute) into the reaction mass during 15 hours. The reaction mass was cooled to 26° C. and filtered. The cake was washed with 10 ml of water, acidified with 32% hydrochloric acid and the resulting suspension was stirred 15 minutes, then filtered. The cake was washed with water, then dried to give 4.4 g of product containing 90% 1,5-dihydroxyanthraquinone and 10% 1,8-dihydroxyanthraquinone (by gas chromatographic analysis). Thin layer chromatography indicated a small amount of an hydroxynitroanthraquinone. The original dimethylformamide filtrate and wash liquor was stirred into 500 ml of water, acidified with 32% hydrochloric acid, stirred for 15 minutes and filtered. The cake was washed with water, then dried to give 10.5 g of product which contained 38% 1,5-dihydroxyanthraquinone and 62% 1,8-dihydroxyanthraquinone (by gas chromatographic analysis). Thin layer chromatographic analysis indicated a small amount of an hydroxynitroanthraquinone.

EXAMPLE 3

Dinitroanthraquinone (same composition as in Example 2) (18.0 g; 0.06 mole), sodium formate (12.2 g; 0.18 mole) and dimethylacetamide (100 ml) was reacted as in Example 2 for 16 hours. The same isolation procedure as given in Example 2 gave a cake of 3.6 g consisting of 95% 1,5- and 5% of 1,8-dihydroxyanthraquinone. The product from the filtrate (9.8 g) consisted of 39.7% 1,5- and 58.6% of 1,8-dihydroxyanthraquinone. 1-Hydroxyanthraquinone was also present in 1.7%. Thin layer chromatographic analysis indicated a small amount of an hydroxynitroanthraquinone in the product isolated from the filtrate only.

EXAMPLE 4

Dinitroanthraquinone (98% 1,5 isomer, 9.0 g; 0.03 mole) sodium fomate (6.1 g; 0.09 mole) and dimethylformamide (50 ml) were stirred at 110° C. under a nitrogen atmosphere for 20.5 hours. The reaction mass was processed as in Example 2 to give a cake of 5.3 g (99% 1,5-dihydroxyanthraquinone; 1% 1-hydroxyanthraquinone) and a filtrate product of 1.6 g (45.8% 1,5-dihydroxyanthraquinone; 42.4% 1-hydroxyanthraquinone and 11.8% of an intermediate of unknown structure. No nitrohydroxyanthraquinone was in either product by thin layer chromatography.

EXAMPLE 5

Dinitroanthraquinone (54.1% 1,5-isomer; 42.1% 1,8-isomer, 3.8% other isomers, 9.0 g; 0.03 mole), dimethylformamide (50 ml) and sodium formate (6.1 g; 0.09 mole) were stirred at 90° C. for 19 hours with air sparging (60–80 ml per minute). Gas chromatographic analysis indicated 8.5% of the intermediate to be present. Reaction was continued for an additional five hours at 90° C. At this point only 2.1% of the intermediate was apparent by gas chromatographic analysis. The products were isolated as in Example 2 to give a cake of 2.2 g (96% 1,5-dihydroxyanthraquinone, 4% 1,8-dihydroxyanthraquinone) and a filtrate product of 4.8 g (14% 1,5-dihydroxyanthraquinone, 86% 1,8-dihydroxyanthraquinone). The total product was 97% of theory.

EXAMPLE 6

Dinitroanthraquinone (same composition as in Example 5, 9.0 g; 0.03 mole), dimethylformamide (50 ml) and sodium formate (6.1 g; 0.09 mole) were stirred at 142°–145° C. (reflux temperature) while air was sparged into the reaction mass at the rate of 214 ml per minute. After one hour a gas chromatographic analysis of a sample of the reaction mass gave the following:

| | |
|---|---|
| 1,5- & 1,8-dihydroxyanthraquinone | 93.0% |
| 1-hydroxyanthraquinone | 2.3% |
| intermediate | 4.7% |

The reaction was continued for a total of 6.5 hours at reflux, then the reaction mass was drowned in water (500 ml) and acidified with hydrochloric acid, the resulting suspension was filtered, the cake obtained washed with water, then dried to give 7.1 g (98.6% of theory) of product. Gas chromatographic analysis gave the following:

| | |
|---|---|
| 1,5- & 1,8-dihydroxyanthraquinone | 89.0% |
| 1-hydroxyanthraquinone | 7.1% |
| intermediate | 3.9% |

The increased content of 1-hydroxyanthraquinone over that obtained after one hour of reaction presumably originates in the reduction of 1,5- and 1,8-(primarily 1,8-)dihydroxyanthraquinone to 1-hydroxyanthraquinone.

EXAMPLE 7

Dinitroanthraquinone (98.0% 1,5-isomer, 18.0 g; 0.06 mole), dimethylformamide (50 ml) and sodium formate (12.2 g; 0.18 mole) were stirred at 110° C. under a nitrogen atmosphere for 20 hours. The reaction mass was processed as in Example 2 to give a cake of 13.0 g (84.3% 1,5-dihydroxyanthraquinone, 2% 1-hydroxyanthraquinone and 13.7% of the intermediate(s) of unknown structure). The product from the filtrate, 1.5 g, contained 33.9% 1-hydroxyanthraquinone, 41.1% 1,5-dihydroxyanthraquinone, 7.1% 1,8-dihydroxyanthraquinone and 17.9% of intermediate.

EXAMPLE 8

Dinitroanthraquinone (56.3% 1,5-isomer, 43.7% 1,8-isomer, 9.0 g; 0.03 mole), dimethylsulfoxide (50 ml) and sodium formate (6.1 g; 0.09 mole) were stirred at 110° C. for 22 hours under a nitrogen atmosphere. The products were isolated as in Example 2 to give the following results:

| | 1-hydroxy-anthra-quinone | 1,5 & 1,8-di-hydroxyanthra-quinone | intermed-iate(s) | dinitro-anthra-quinone |
|---|---|---|---|---|
| cake (2.0 g) | 2.7 | 75.0 | 21.3 | 1.1 |
| from filtrate (4.5 g) | 7.1 | 66.5 | 23.9 | 3.0 |

EXAMPLE 9

Dinitroanthraquinone (same composition as in Example 2, 18.0 g; 0.06 mole), N-methylpyrrolidone (100 ml) and sodium formate (12.2 g; 0.18 mole) were stirred at 110° C. for 16 hours while air was sparged into the reaction mass. Product work-up as in Example 1 gave a cake of 1.9 g (92.5% 1,5-dihydroxyanthraquinone, 7.5% 1,8-dihydroxyanthraquinone) and a filtrate product of 12.0 g (4.0% 1-hydroxyanthraquinone, 88% 1,5- and 1,8-dihydroxyanthraquinone, 2.7% intermediate and 5.3% dinitroanthraquinones).

EXAMPLE 10

Dinitroanthraquinone (59.1% 1,5-; 42.1% 1,8-isomers, 9.0 g; 0.03 mole), dimethylformamide (50 ml) and sodium formate (molar ratio of formate to dinitroanthraquinone of 1:1, 2:1, and 4:1 used) were stirred at 110° C. for 16–17 hours. The products were isolated as in Example 1. Results obtained:

| Molar Ratio Formate to Dinitro AQ | Reaction Atmosphere | 1-Hydroxy AQ | 1,5- & 1,8-Dihydroxy AQ | Intermediates | Weight of Total Product |
|---|---|---|---|---|---|
| 1:1 | Air | 0.2% | 78.7% | 21.1% | 8.0 g |
| 1:1 | N₂ | 6.1% | 81.8% | 12.0% | 7.4 g |
| 2:1 | Air | Trace | 82.6% | 17.4% | 6.7 g |
| 4:1 | Air | 0.9 | 92.6% | 6.5% | 6.8 g (Theory wt. 7.2 g) |

Product from 1:1 reaction contained appreciable amount of a hydroxynitroanthraquinone (by thin layer chromatography).

EXAMPLE 11

Anthraquinone was dinitrated in the standard way in sulfuric acid using a mixture of 40% nitric acid- 60% sulfuric acid. The nitration mass was filtered hot on a glass filter cloth, washed with sulfuric cid, then further processed by drowning in water to give a product of the following composition:

| | |
|---|---|
| 1-nitroanthraquinone | 1.6% |
| 1,6- & 1,7-dinitroanthraquinone | 11.7% |
| 1,5- & 1,8-dinitroanthraquinone | 86.7% |

The dried product was further reacted as follows:

Dinitroanthraquinone (18.0 g; 0.06 mole), dimethylacetamide (50 ml) and sodium formate (12.2 g; 0.18 mole) were stirred at 110° C. for 21 hours under a nitrogen atmosphere. The reaction mass was cooled to 27° C. and filtered. The cake obtained was washed with dimethylacetamide (5 ml). Both cake and filtrate were further processed by stirring in water (300 mole each), acidifying with hydrochloric acid and filtering the suspension obtained. After drying, analysis of the products gave the following:

| | 1-Hydroxy AQ | 1,5-Dihydroxy AQ | 1,8-Dihydroxy AQ | Intermediates |
|---|---|---|---|---|
| Cake (6.1 g) | Trace | 84.2% | 14.9 | 0.9% |
| Filtrate product 8.1 g | 5.3% | 26.5% | 66.4% | 1.8% |

There was no apparent hydroxynitroanthraquinone in either product by thin layer chromatography.

EXAMPLE 12

Dinitroanthraquinone (98% 1,5-isomer, 9.0 g, 0.03 mole), tetramethylurea (50 ml, 99% purity) and sodium formate (6.1 g, 0.09 mole) were stirred at 110° C. under a nitrogen atmosphere for 23 hours. The reaction mass was cooled to 27° C. and filtered. The cake was stirred with water (150 ml) and acidified with hydrochloric acid and the resulting suspension was filtered. The cake was dried to yield 6.1 g which contained 95.5% 1,5-dihydroxyanthraquinone and 4.5% of intermediates. (By gas chromatographic analysis).

The original tetramethylurea filtrate was flash distilled under vacuum (10 mm) to recover the reaction medium (38 ml recovered, 76%). The residue was stirred with water (150 ml), acidified with hydrochloric acid and the resulting suspension was filtered. The cake was dried to give 1.2 g which contained:

| 1-Hydroxy AQ | 1,5-Dihydroxy AQ | 1,8-Dihydroxy AQ | Intermediate & Unknowns |
|---|---|---|---|
| 1.1% | 28.6% | 22.9% | 47.3% |

Thin layer chromatographic analysis of the products indicated a small amount of an hydroxynitroanthraquinone in the product from the filtrate only.

EXAMPLE 13

1-Nitroanthraquinone (96% purity, 7.6 g; 0.03 mole) dimethylformamide (50 ml) and sodium carbonate (6.4 g; 0.06 mole) were stirred at 130° C.–132° C. for 21 hours. The resulting dark reddish-brown mixture was diluted with water (350 ml) and carefully acidified with 32% hydrochloric acid. The suspension obtained was stirred for one hour, then filtered. The cake obtained was washed with water, then vacuum dried to yield 6.7 g. GLC analysis gave the following:

| anthraquinone | trace |
|---|---|
| 1,hydroxyanthraquinone | 75.6% |
| 1-nitroantraquinone | 21.8% |
| unknown | 2.6% |

When the same reaction was maintained at reflux (150° C.) for 10 hours 6.6 g of product was obtained that contained 99.3% 1-hydroxyanthraquinone by GLC analysis.

Although the present invention has been described in conjunction with certain preferred embodiments thereof, it is to be understood that the invention is not limited to the embodiments but, instead, includes all those embodiments within the scope and spirit of the appended claims.

What is claimed is:

1. A process for preparing a dihydroxyanthraquinone comprising reacting a dinitroanthraquinone with a metal salt selected from the group consisting of sodium formate and potassium formate at a molar ratio of metal salt to dinitroanthraquinone of at least 1.1 and in a reaction medium selected from the group consisting of dimethylformamide; dimethylacetamide; tetramethylurea; N-methylpyrrolidone; dimethylsulfoxide; tetramethylene sulfone; dimethylsulfone; N,N-dimethylmethylcarbamate and pyridine at a temperature of from 80° C. to 150° C. and separating the dihydroxyanthraquinone from the reaction system.

2. The process of claim 1 wherein said nitroanthraquinone is 1,5-dinitroanthraquinone; 1,8-dinitroanthraquinone or a mixture of these.

3. The process of claim 2 wherein the reaction temperature is in the range of from 95° C. to 145° C.

4. The process of claim 2 wherein the reaction medium is selected from the group consisting of dimethylformamide; dimethylacetamide; tetramethylurea and N-methylpyrrolidone.

5. The process of claim 4 wherein the molar ratio of the metal salt to the nitroanthraquinone at the start of the reaction is in the range of 1:1 to 5:1.

6. The process of claim 5 wherein said molar ratio is in the range of from 2:1 to 3:1.

7. The process of claim 1 wherein the reaction is carried out for a length of time sufficient to convert the nitroanthraquinone to the corresponding hydroxyanthraquinone.

8. The process of claim 1 wherein the initial concentration of the nitroanthraquinone in the reaction medium is in the range of from 6 to 27 weight percent.

* * * * *